United States Patent
Murofushi et al.

(10) Patent No.: US 6,321,489 B1
(45) Date of Patent: Nov. 27, 2001

(54) POWER FEEDING UNIT FOR MOTOR VEHICLE SLIDING DOOR

(75) Inventors: Satoru Murofushi; Masataka Nishijima, both of Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/537,428

(22) Filed: Mar. 27, 2000

(30) Foreign Application Priority Data

Apr. 16, 1999 (JP) .................................................. 11-109017

(51) Int. Cl.⁷ ........................................................ E05F 11/00
(52) U.S. Cl. ................................................................. 49/360
(58) Field of Search ............................ 49/147, 148, 360, 49/262; 296/155; 242/378, 388; 191/112, 212

(56) References Cited

U.S. PATENT DOCUMENTS

| | | | |
|---|---|---|---|
| 5,453,585 | * 9/1995 | Lenz et al. | 191/12.2 R |
| 5,536,061 | * 7/1996 | Moore et al. | 49/360 X |
| 5,581,944 | * 12/1996 | Kornbrekke et al. | 49/360 X |
| 5,657,940 | * 8/1997 | Ishikawa et al. | 242/388 |
| 6,076,883 | * 6/2000 | Labonde et al. | 49/360 X |
| 6,108,976 | * 8/2000 | Kato et al. | 49/360 |

FOREIGN PATENT DOCUMENTS 4-124555  11/1992  (JP) .
7-222274  8/1995  (JP) .

* cited by examiner

Primary Examiner—Jerry Redman
(74) Attorney, Agent, or Firm—Armstrong, Westerman, Hattori, McLeland & Naughton, LLP (57) ABSTRACT

A power feeding unit for motor vehicle sliding door, wherein a feeding wire having a large number of circuits on the sliding door side can be connected to another feeding wire on the vehicle body side without breaking the power feeding even during the sliding door is opened or shut, is provided, which includes: a sliding door to be slidably assembled to a vehicle body by means of a supporting arm provided on the sliding door and slidably engaging a guide rail provided on the vehicle body; a slide rail provided on the vehicle body in almost parallel with the guide rail; a feeding wire arranged from the vehicle body to the sliding door for feeding electric power to an electric appliance provided on the sliding door; a winder provided on an end portion of the slide rail for winding the feeding wire; and a feeding wire fixing member fixed to the feeding wire to fix the feeding wire, the feeding wire fixing member sliding along the slide rail along with the supporting arm.

16 Claims, 11 Drawing Sheets

POWER FEEDING UNIT FOR MOTOR VEHICLE SLIDING DOOR

BACKGROUND OF THE INVENTION

1. Field of the Invention

The present invention generally relates to a power feeding unit for motor vehicle sliding door, and more particularly, a power feeding unit provided between a vehicle body and the sliding door slidably attached to the vehicle body.

2. Description of the Related Art

Conventionally, abutting terminals shown in Japanese Utility Model Application Laid-open No. 4-124555 is known as a power feeding unit for motor vehicle sliding door.

Figure 8:
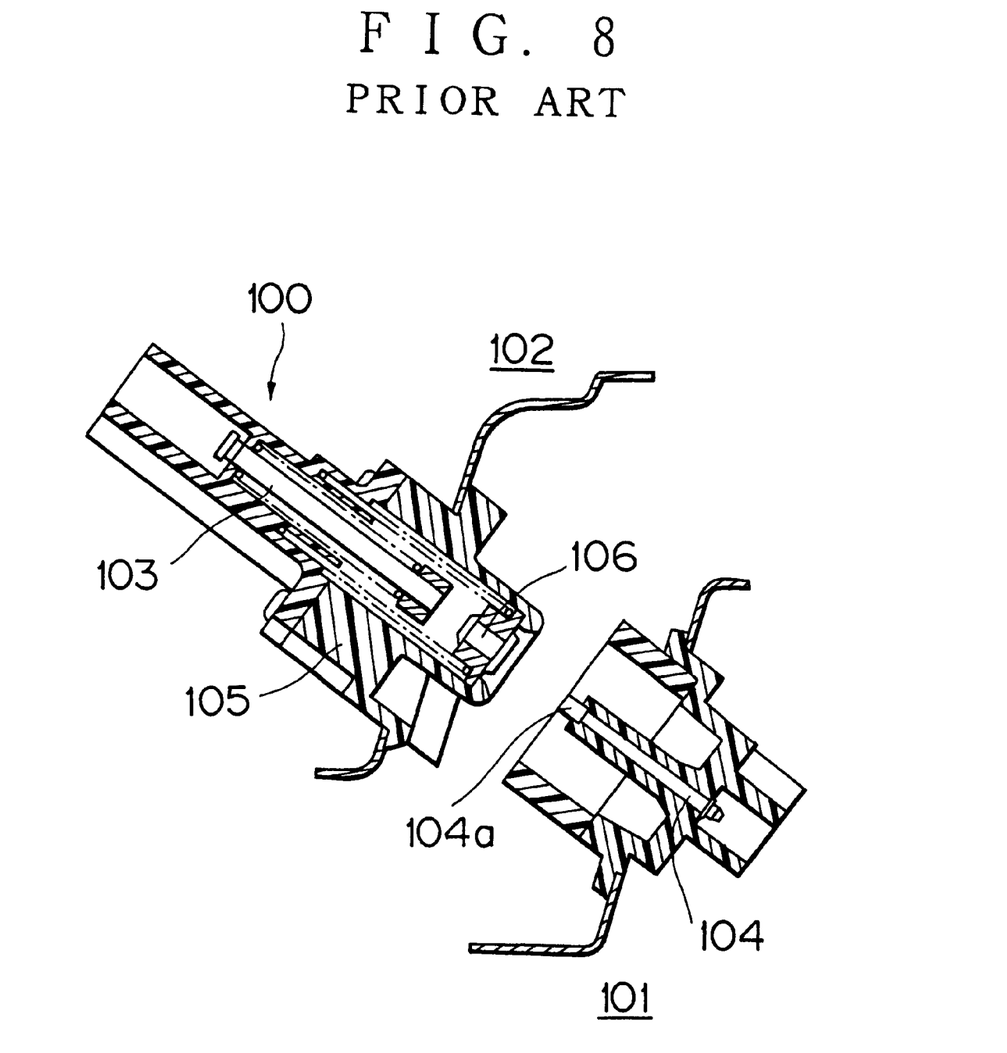
FIG. 8 is a longitudinal sectional view showing a prior art power feeding unit.
Figure 9A:
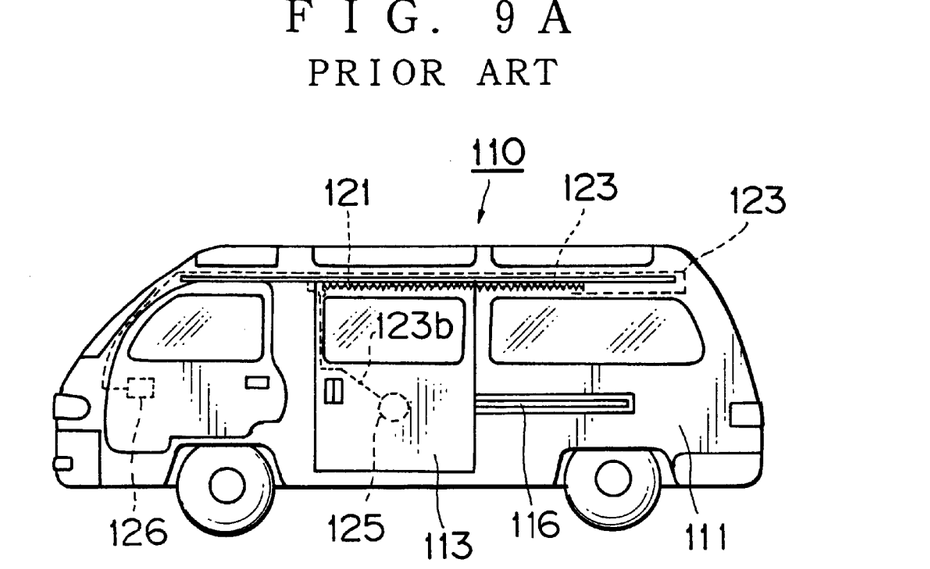
FIGS. 9A, 9B are side views showing a motor vehicle carrying another prior art power feeding unit.
Figure 9B:
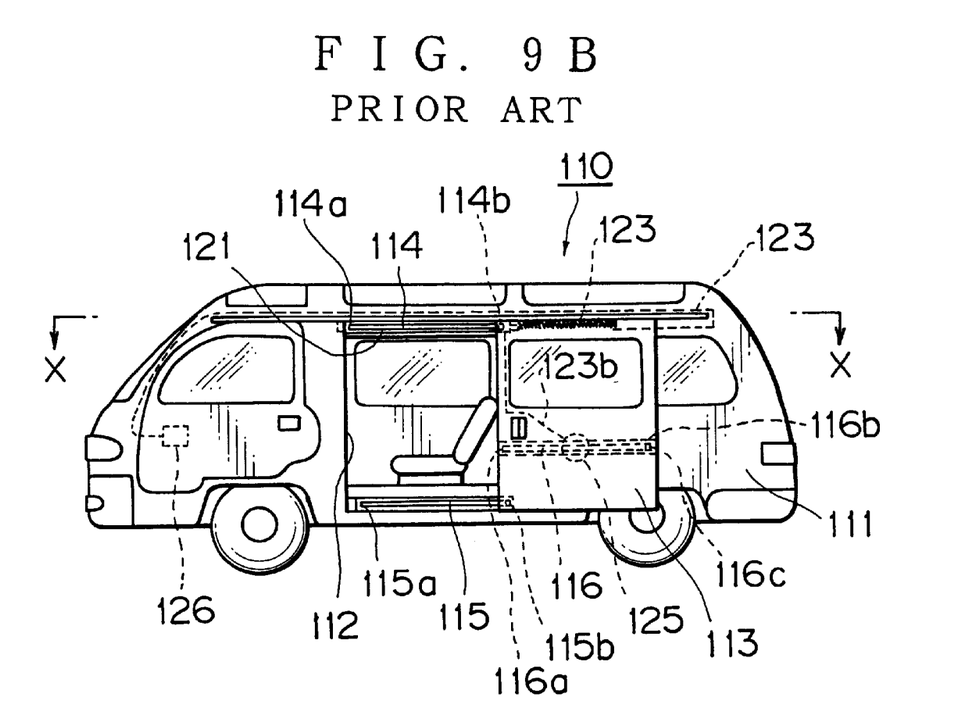
Figure 10A:
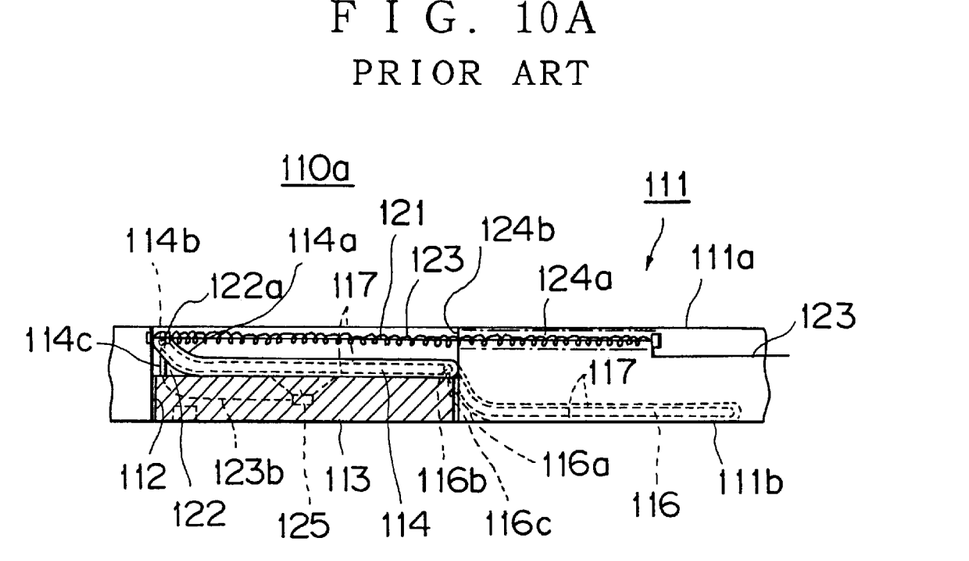
FIGS. 10A, 10B are plan views showing the power feeding unit of FIGS. 9A, 9B.
Figure 10B:
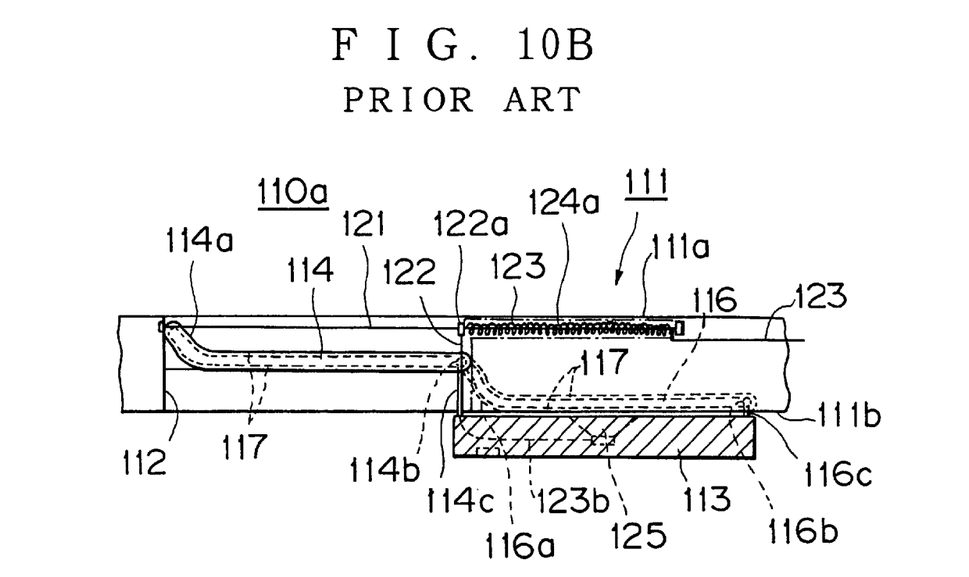
Figure 11A:
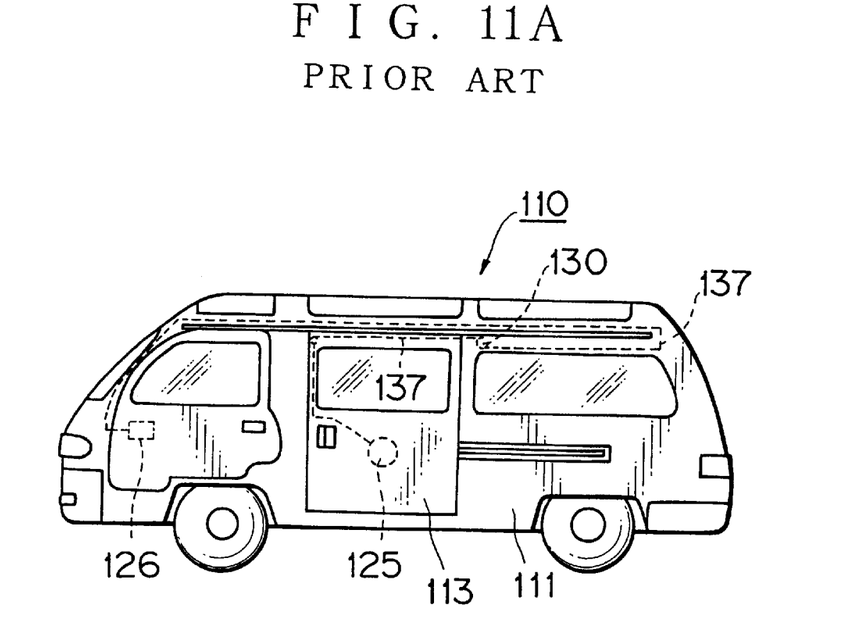
FIGS. 11A, 11B are side views showing a motor vehicle carrying still another prior art power feeding unites.
Figure 11B:
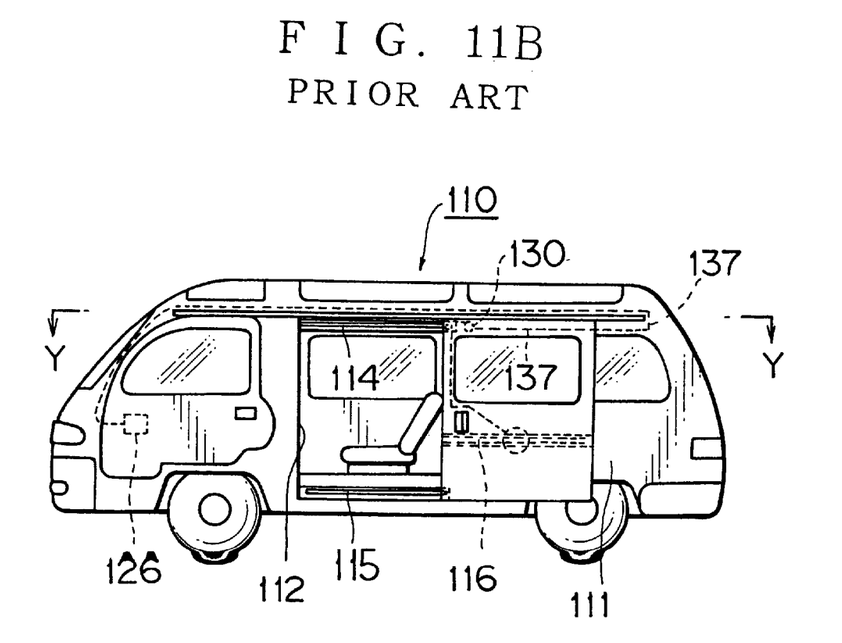
Figure 12A:
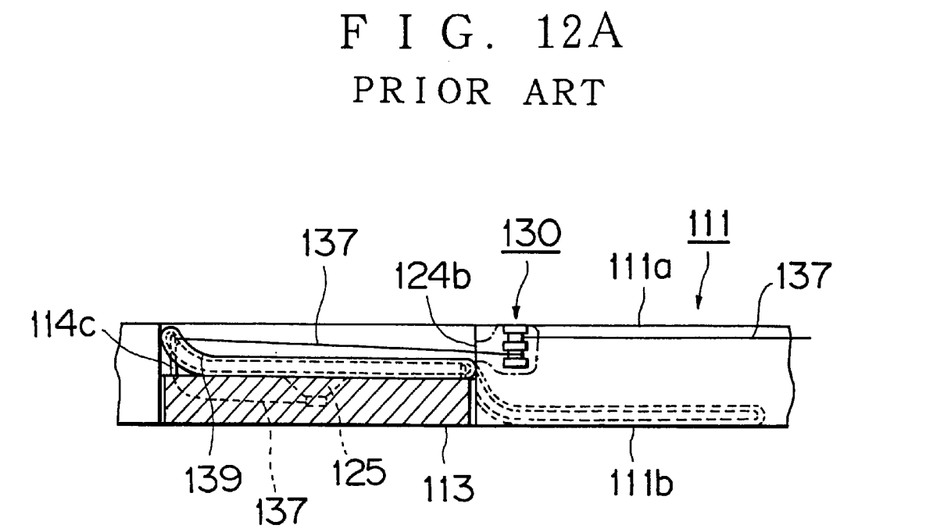
FIGS. 12A, 12B are plan views showing the power feeding unit of FIGS. 11A, 11B.
Figure 12B:
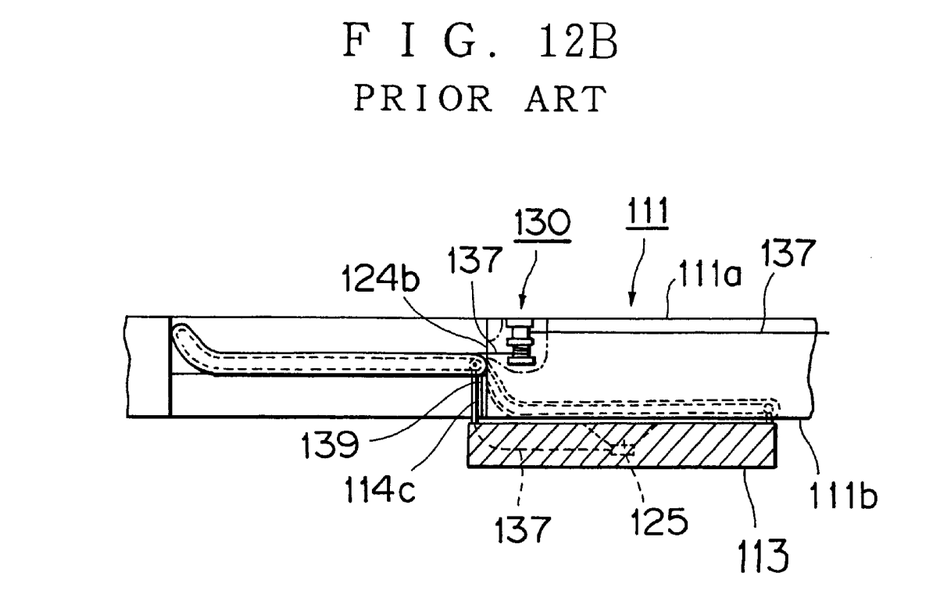

That is, as shown in FIG. 8, in a power feeding unit 100, a first feeding terminal 103 to be connected to a battery side (not illustrated) is provided on a vehicle body 102 side and a second feeding terminal 104 to be connected to a door control unit (not illustrated) side is provided on a sliding door 101 capable of sliding back and forth. A connectable and disconnectable terminal 106 being surrounded with an insulating member 105 is provided on the first feeding terminal 103. And, on shutting the sliding door 101, the terminal 106 is pushed by the end 104a of the second feeding terminal 104 and is sandwiched, whereby the first and the second feeding terminals 103,104 are connected.

In the above prior art, however, in an opened-state of the sliding door 101, because the power feeding to the sliding door 101 side stops, measures such as prevention of putting a person therebetween cannot be taken. And, because of having double contact points, reliability would not be high.

When the above sliding door is opened, because the sliding door is once pull forward and is slid rearward, it would not be so easy to feed electric power to the sliding door side without a break.

A power feeding unit solving the above problems is, however, disclosed in Japanese Patent Application Laid-open No. 7-222274.

In FIGS. 9A, 9B, 10A, and 10B, a getting-on-and-off opening 112 is formed substantially in a middle portion of a body sidewall portion 111 of a high-roof type motor vehicle 110, and a sliding door 113 slidable back and forth is provided on getting-on-and-off opening 112. At upper and lower portions of the getting-on-and-off opening 112, respective slider rails 114,115 are formed on the body sidewall portion 111. And, another slider rail 116 is formed on the body sidewall portion 111 behind the opening 112.

Front portions 114a, 115a, 116a of the respective slider rails 114, 115, 116 curve to a cabin 110a side by a thickness of the sliding door 113. The hinge rollers 114b,115b,116b are inserted into the respective slider rails 114,115,116, and engage edge portions 117 of the slider rails 114,115,116, which the hinge rollers 114b,115b,116b are provided on end portions of respective hinge portions 114c,115c,116c rotatably.

The other ends of the respective hinge portions 114c,115c, 116c are secured to a front-upper portion, a front-lower portion, and a rear-middle portion, respectively, of the sliding door 113. And, the sliding door 113 is slidably supported by the body sidewall portion 111 through the hinge portions 114c,115c,116c, the hinge rollers 114b,115b, 116b, and the slider rails 114,115,116.

Over the slider rail 114, a supporting rod 121 is provided. One end portion of the supporting rod 121 is engaged with the body sidewall portion 111 at the front of a getting-on-and-off opening 112. The other end is engaged with an inner panel 111a inside the body sidewall portion 111 at the back of the getting-on-and-off opening 112.

A cable 123 is wound to the supporting rod 121, and a cave portion 124a for the cable 123 is formed inside the body sidewall portion 111 in order to prevent the cable 123 from coming into contact with the inner panel 111a, an outer panel 111b, and the like. An opening portion 124b for the cable 123 is formed on the body sidewall portion 111 on a side of the getting-on-and-off opening 112.

The cable 123 is continuously pulled rearward by its own torsional elasticity. And, the cable 123 is connected to an electric appliance 126.

On the other hand, a receiving portion 122 slidable laterally is provided on the hinge portion 114c, and a ring portion 122a is formed at the end of the receiving portion 122. A supporting rod 121 is put through the ring portion 122a and supports the cable 123. And, the other end 123b of the cable 123 goes through the receiving portion 122 and the hinge portion 114c and connected to an electric appliance (e.g. speaker) 125 in the sliding door 113.

In the above prior art, however, a large accommodating space of the cable 123, that is, the cave portion 124a is necessary and further a long cable is necessary, which cause big electric resistance.

And, a larger winding diameter of the cable 123 is required in case that a number of circuits are necessary, which causes a larger receiving space.

Next, another example disclosed in the above Patent Application Laid-open No. 7-222274 will be described hereinafter.

Referring to FIGS. 11A, 11B, 12A, and 12B, a reel mechanism 130 having a coil spring (not illustrated) is provided in the body sidewall portion 111 at the back of the getting-on-and-off opening 112. And, a receiving portion 139 is provided on the hinge portion 114c of the sliding door 113. The cable 137 wound to the reel mechanism 130 goes through an opening portion 124b and is secured to the receiving portion 139. And further, the cable 137 goes along the receiving portion 139 and the hinge portion 114c, and is connected to an electric appliance (e.g. speaker) 125 installed inside the sliding door 113.

The other structures of the sliding door 113 are similar to the above example.

In case of the present power feeding unit, however, the reel with a large diameter is required in order to reduce the winding number of the cable, which makes the unit larger.

Further, a larger reel mechanism is required in case that a number of circuits are necessary or a larger electric wire is used.

SUMMARY OF THE INVENTION

In view of the foregoing, an object of the present invention is to provide a power feeding unit for motor vehicle sliding door wherein a feeding wire having a large number of circuits on the sliding door side can be connected to another feeding wire on the vehicle body side without breaking the power feeding even during the sliding door is opened or shut.

In order to achieve the above-described object, as a first aspect of the present invention, a power feeding unit for motor vehicle sliding door in accordance with the present invention includes: a sliding door to be slidably assembled to a vehicle body by means of a supporting arm provided on the sliding door and slidably engaging a guide rail provided on the vehicle body; a slide rail provided on the vehicle body in almost parallel with the guide rail; a feeding wire arranged from the vehicle body to the sliding door for feeding electric power to an electric appliance provided on the sliding door; a winder provided on an end portion of the slide rail for winding the feeding wire; and a feeding wire fixing member fixed to the feeding wire to fix the feeding wire, the feeding wire fixing member sliding along the slide rail along with the supporting arm.

As a second aspect of the present invention, in the structure with the above first aspect, the feeding wire is of a flexible flat cable.

As a third aspect of the present invention, in the structure with either one of the above first and second aspects, the feeding wire drawn from the winder is arranged inside the slide rail.

As a fourth aspect of the present invention, in the structure with either one of the above first and second aspects, a wiring harness is connected to the electric appliance, and a connecting means to connect the wiring harness with the feeding wire being drawn from the winder is provided on the feeding wire fixing member.

As a fifth aspect of the present invention, in the structure with either one of the above first and second aspects, the feeding wire is connected by means of an electric connector at the supporting arm.

As a sixth aspect of the present invention, in the structure with any one of the proceeding aspects, the feeding wire is secured with a securing member at the supporting arm.

According to the above-described structure of the present invention, the following advantages are provided.

(1) The feeding wire having a plurality of circuits can be provided between the sliding doors and the vehicle body, wherein the power feeding can remain alive even during the sliding door is opened or shut.
(2) The feeding wire having a large number of circuits can be dealt with.
(3) Damage of the feeding wire is prevented by the slide rail.
(4) Connection between with the feeding wire and the wiring harness can be carried out easily.
(5) The power feeding unit can be mounted to the vehicle body easily.
(6) Tensile force by the winder works on the securing member, whereby damage of the feeding wire due to opening and shutting of the sliding door can be prevented.

The above and other objects and features of the present invention will become more apparent from the following description taken in conjunction with the accompanying drawings.

DESCRIPTION OF THE PREFERRED EMBODIMENT

An embodiment of the present invention will now be described in further detail with reference to the accompanying drawings.

Figure 5:
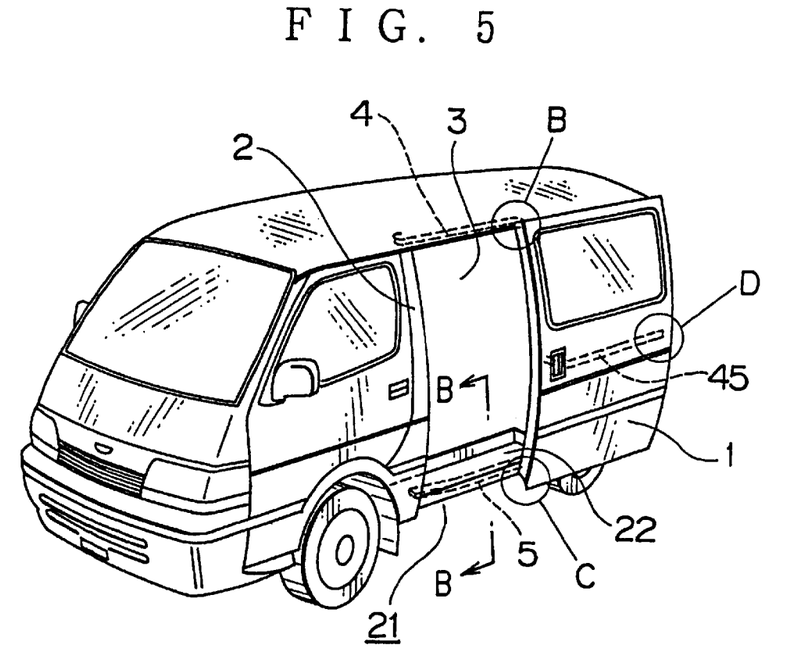
FIG. 5 is a perspective view showing an example of a motor vehicle with a sliding door automatic driving unit.
Figure 6:
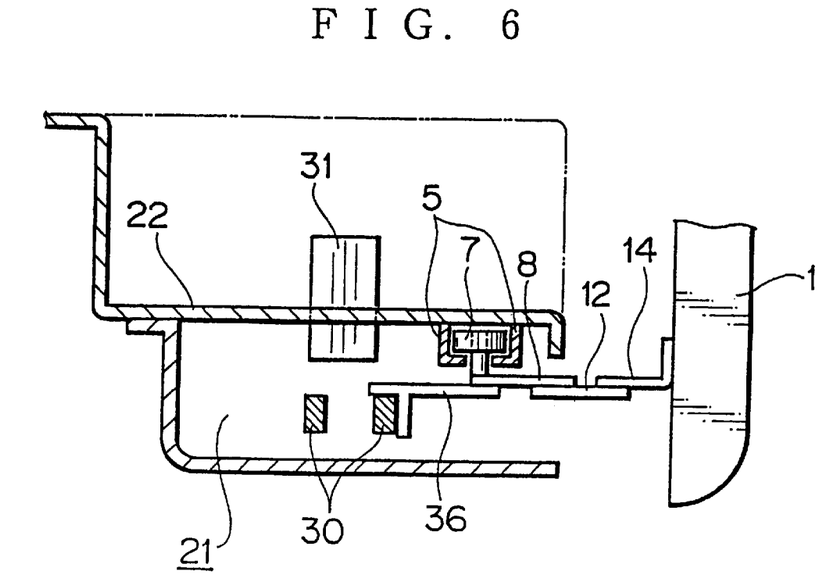
FIG. 6 is a sectional view taken along a line B—B in FIG. 5.
Figure 7:
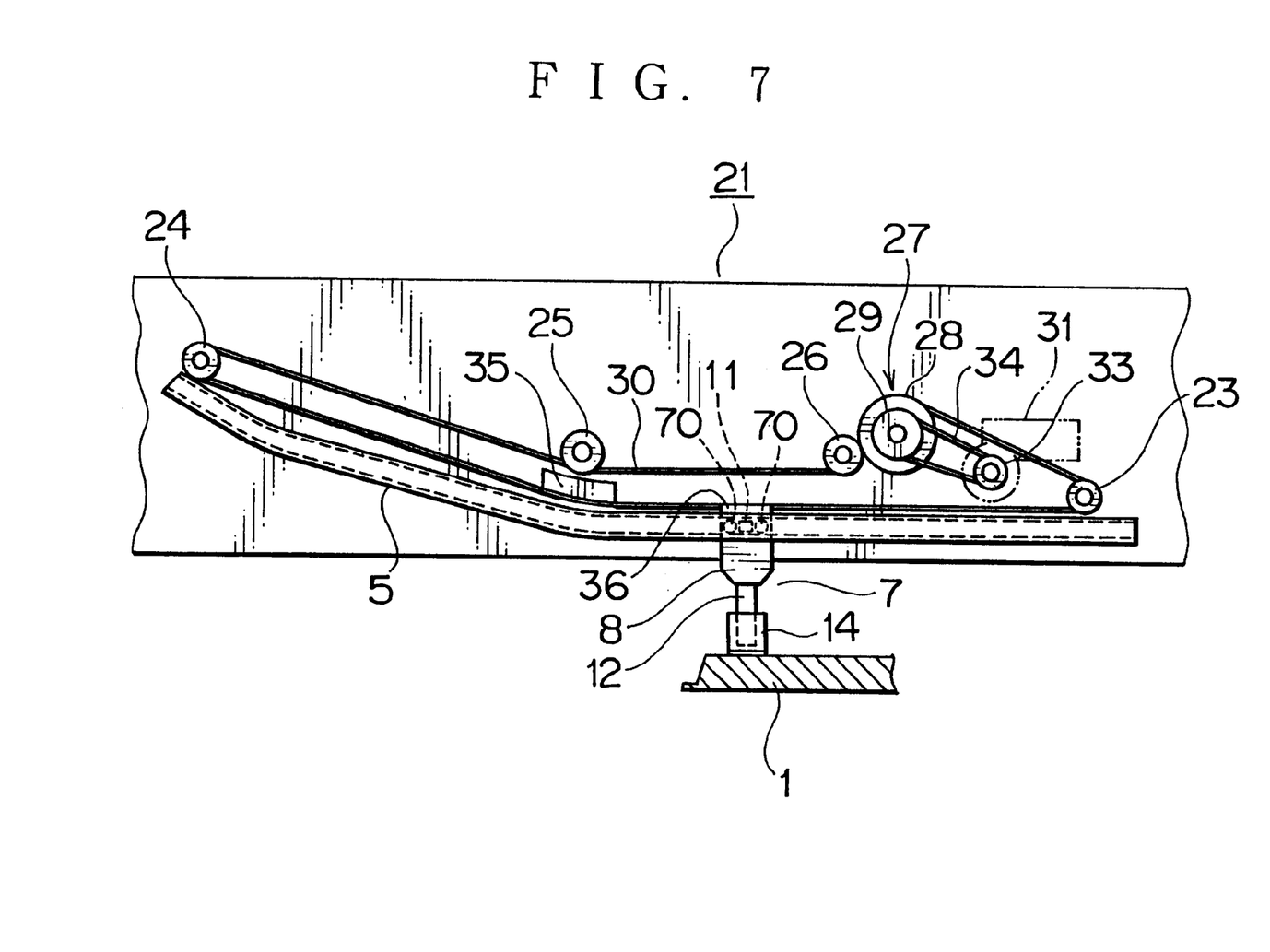
FIG. 7 is a plan view showing the sliding door automatic driving unit.

However, before describing an embodiment of the present invention, a motor vehicle to which the present invention is applied is described, referring to FIGS. 7–5.

FIG. 5 is a perspective view showing an example of a motor vehicle with a sliding door automatic driving unit; FIG. 6 is a sectional view taken along a line B—B in FIG. 5; and FIG. 7 is a plan view showing the sliding door automatic driving unit.

The vehicle body 2 has an opening 3, and an upper rail 4, a lower guide rail 5, and a center rail 45 are arranged at a top and bottom sides of the opening 3 and in the center of a rear sidewall of the vehicle body 2, respectively. And, an upper roller, a lower roller, and a center roller arranged at a front-upper portion B, a front-lower portion C, and a rear-center D of a sliding door 1, respectively, engage the upper rail 4, the lower rail 5, and the center rail 45 slidably.

A pair of rollers 70 of a lower roller 7 is supported by a pair of vertical axes provided on a roller supporting member 8, and a running roller 11 is supported by a horizontal axis provided between the vertical axes of the roller supporting member 8. The roller supporting member 8 is attached to a supporting arm 12, and the supporting arm 12 is attached to a L-shaped bracket 14 fixed to the sliding door 1.

An automatic driving unit 21 of the sliding door 1 is arranged under a step panel 22 provided under the opening 3, which automatic driving unit 21 has various parts such as pulleys and equipment such as an electric motor. Driven pulleys 23,24 are arranged on the respective end portions of the step panel 22, and idle pulleys 25,26 are arranged between the driven pulleys 23,24. A driving pulley 27 is arranged between the idle pulley 26 and the driven pulley 23. The driving pulley 27 is made up of a small-diameter toothed pulley 29 and a large-diameter toothed pulley 28. A jointless toothed belt 30 is put round the driven pulleys 23,24, the idle pulleys 25,26, and the toothed pulley 28.

The electric motor 31 is fitted to an electromagnetic clutch 32 and fixed to the back of the step panel 22. And, another jointless toothed belt 34 is put round the small-diameter toothed pulley 29 of the driving pulley 27 and a toothed pulley 33 of the electromagnetic clutch 32. Through the electromagnetic clutch 32, the driving force of the electric motor 31 is transmitted in the following order: the toothed pulley 33→the jointless toothed belt 34→the toothed pulley 29 (the toothed pulley 28)→the jointless toothed belt 30.

And, the lower guide rail 5 is fixed to the step panel 22 along the belt guide 35 arranged between the driven pulleys 23,24. And, a driving bracket 36 is connected to the jointless toothed belt 30 positioned between the driven pulleys 23,24.

According to the sliding door automatic driving unit 21 of the above structure, the jointless toothed belt 30 moves between the driven pulleys 23,24 due to a drive of the electric motor 31. The driving bracket 36 is connected to the jointless toothed belt 30, and the sliding door 1 is driven through the driving bracket 36. The driving bracket 36 is fixed to the roller supporting member 8 of the lower roller 7.

Hereinafter, an embodiment of the present invention will be described referring to FIGS. 1–3, wherein the same parts or members as in the previous figures have the same reference characters.

Figure 1:
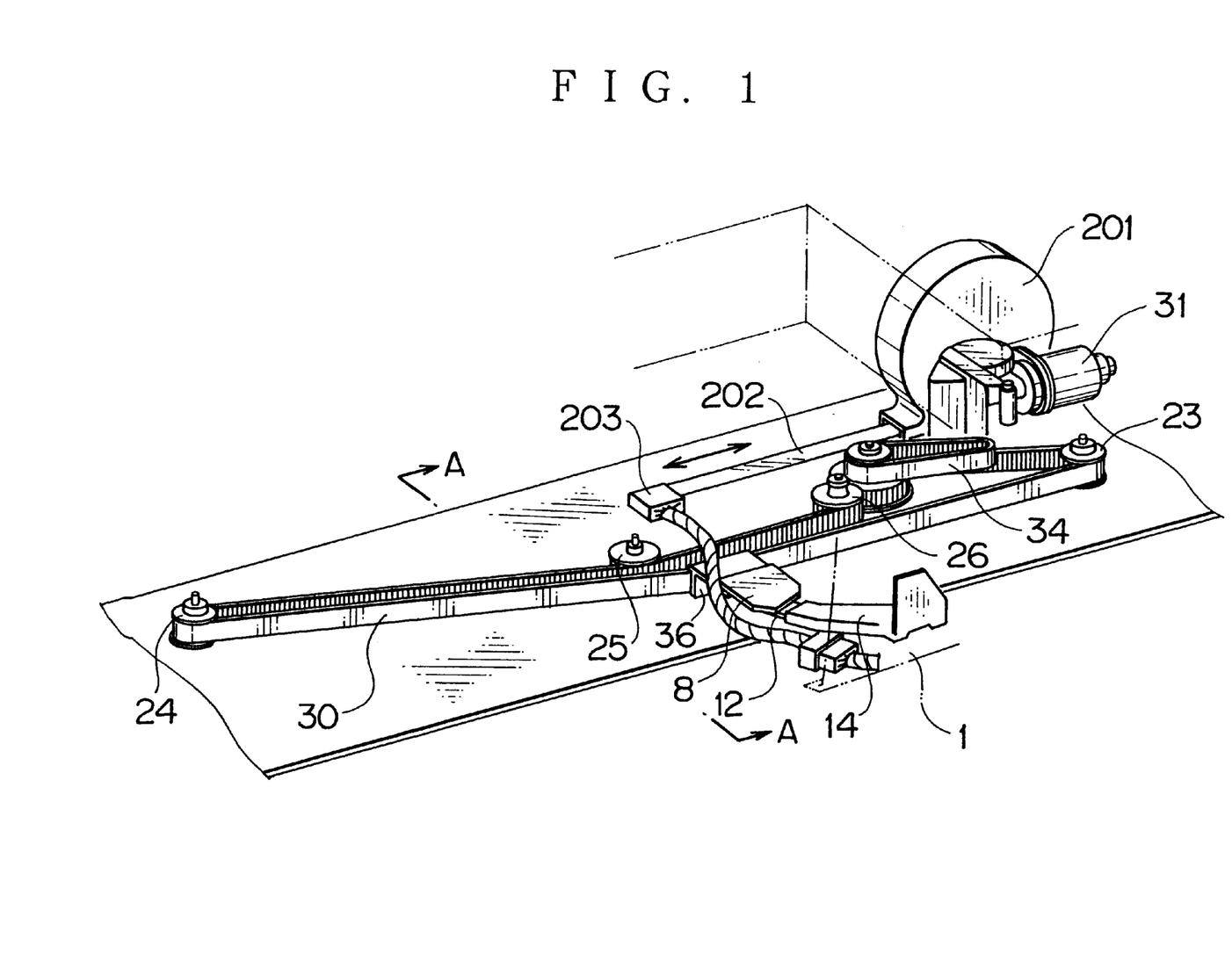
FIG. 1 is a perspective view showing the power feeding unit for motor vehicle sliding door in accordance with the present invention.

FIG. 1 is a perspective view showing the power feeding unit for motor vehicle sliding door in accordance with the present invention; FIG. 2 is a sectional view taken along a line A—A in FIG. 1; and FIG. 3 is a plan view showing an arrangement of a lower rail and a slide rail of the present invention.

In FIGS. 1–3, 200 is a slide rail provided in substantially parallel with the lower rail 5 to guide the sliding door 1; 201 is a winder to wind up a flexible flat cable (i.e. FFC) 202; 203 is a feeding wire fixing member being attached to the end of FFC 202 and being guided by the slide rail 200; 204 and 205 are wiring harnesses; and 206 is a connector.

Figure 4A:
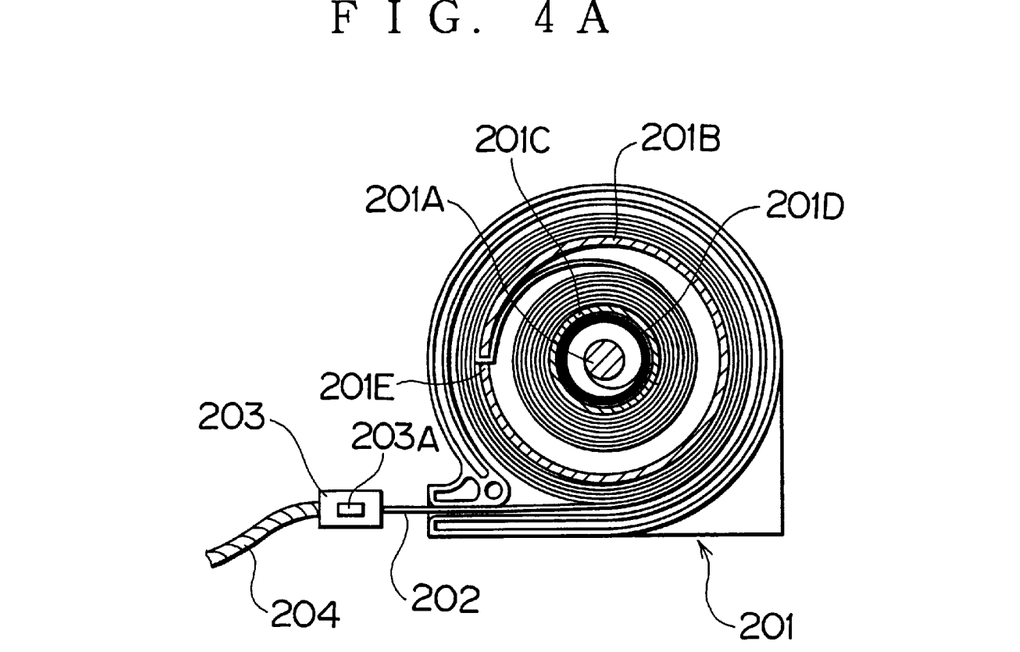
FIGS. 4A, 4B are sectional views of a winder.
Figure 4B:
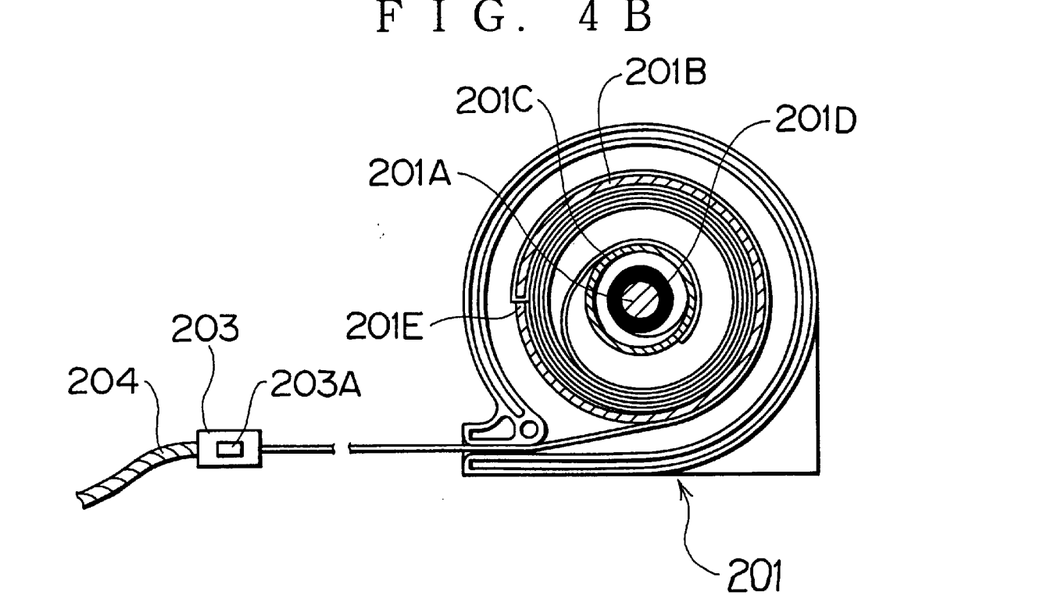

As shown in FIGS. 4A, 4B, a rotating drum 201B having a rotation axis 201A is provided on the winder 201 and, a fixed drum 201C is provided between the rotating drum 201B and the rotation axis 201A. A spring 201D to rotate the rotation axis 201A and the rotating drum 201B in a counterclockwise sense is provided between the drum 201C and the rotation axis 201A.

As shown in FIG. 4A, FFC 202 is inserted through a slit 201E provided on the rotating drum 201B. FFC 202 is wound to the drum 201C in a clockwise sense and to the rotating drum 201B reversely.

On the other hand, as shown in FIG. 4B, the rotating drum 201B rotates with withdrawal of FFC 202, and FFC 202 having wound to the drum 201C loosens due to rotation of the rotating drum 201B toward the rotating drum 201B side.

A feeding wire fixing member 203 is attached to the end of FFC 202, and a connection means to connect a conductor of the wiring harness 204 and a conductor of FFC 202 is provided inside the feeding wire fixing member 203.

Figure 2:
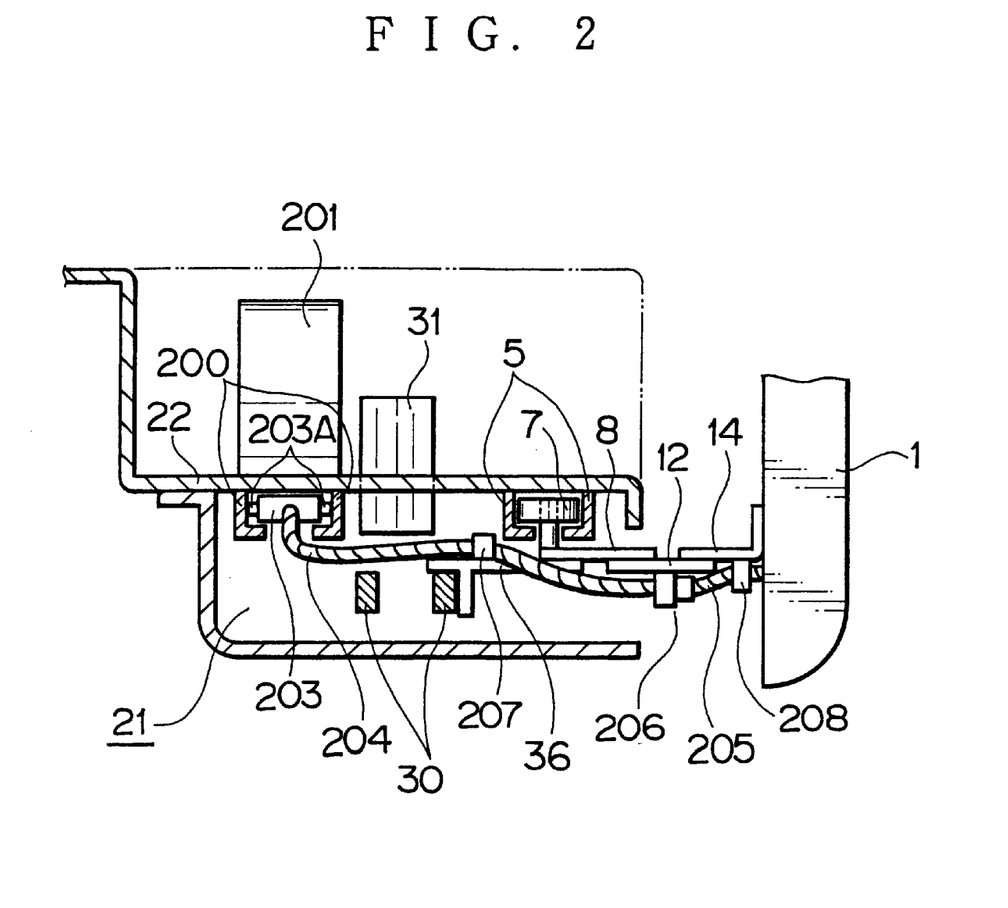
FIG. 2 is a sectional view taken along a line A—A in FIG. 1.

As shown in FIG. 2, the slide rail 200 has a four-sided cross-section wherein the feeding wire fixing member 203 slides. And, FFC 202 connected with the feeding wire fixing member 203 is arranged inside the slide rail 200 and is protected. The wiring harness 204 connected with the feeding wire fixing member 203 is drawn from a slit of the slide rail 200.

And, a roller 203A is provided on a side surface of the feeding wire fixing member 203 in order to reduce slide resistance. The wiring harness 204 connected with the feeding wire fixing member 203 is secured to the driving bracket 36 with a securing member 207 and is connected a wiring harness 205 on a side of the door 1 through a connector 206.

Figure 3:
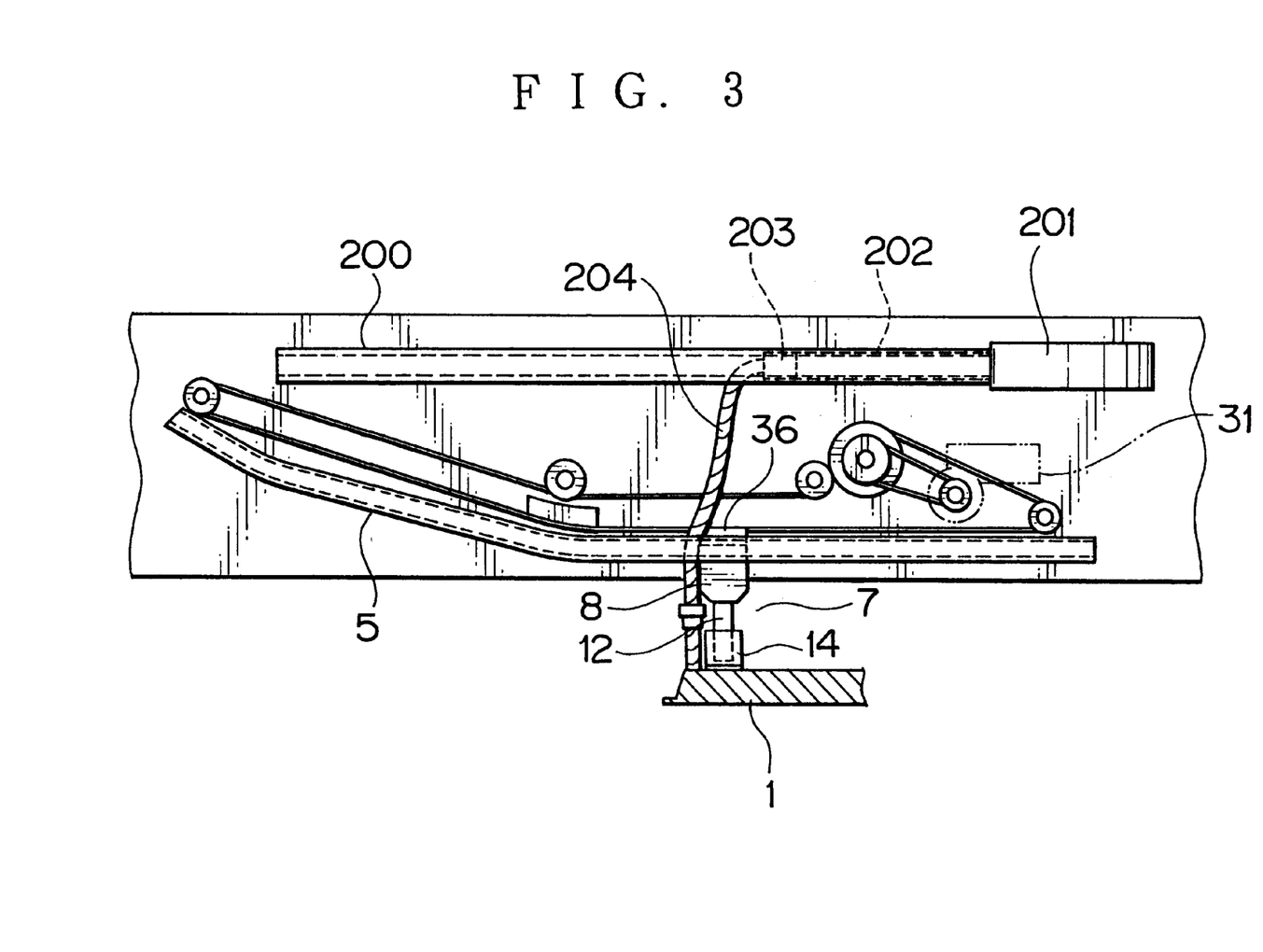
FIG. 3 is a plan view showing an arrangement of a lower rail and a slide rail of the present invention.

As shown in FIG. 3, the slide rail 200 substantially parallels the lower rail 5 which makes the sliding door 1 slide. Accordingly, when the sliding door 1 is opened or shut, the wiring harness 204 secured with the securing member 207 shifts, and when the wiring harness 204 shifts, the feeding wire fixing member 203 connected with the wiring harness 204 slides along the slide rail 200.

When the feeding wire fixing member 203 shifts along the slide rail 200, FFC 202 is drawn from the winder 201 or wound up.

In the above embodiment, though the wiring harness 204 is connected to FFC 202 at the feeding wire fixing member 203, FFC 201 may be connected to the connector 206 directly and the feeding wire fixing member 203 may be provided on the way in order to secure FFC 202 only.

The present invention can be variously changed and modified by those skilled in the art within the scope of the present invention, which should be construed as being included therein.

What is claimed is:

1. A power feeding unit for a motor vehicle sliding door which is slidably assembled to a vehicle body by means of a supporting arm, provided on the sliding door, which slidably engages a guide rail provided on the vehicle body, said power feeding unit comprising a continuous slide rail provided on the vehicle body in almost parallel with the guide rail;

a feeding wire arranged from the vehicle body to the sliding door and arranged to feed electric power to an electric appliance provided on the sliding door;

a winder provided on an end portion of the continuous slide rail and arranged to wind the feeding wire; and a feeding wire fixing member fixed to the feeding wire to fix the feeding wire, the feeding wire fixing member being arranged to engage and slide along the continuous slide rail along with the supporting arm.

2. The power feeding unit according to claim 1, wherein the feeding wire is of a flexible flat cable.

3. The power feeding unit according to claim 2, wherein the feeding wire drawn from the winder is arranged inside the slide rail.

4. The power feeding unit according to claim 3, wherein the feeding wire is secured with a securing member at the supporting arm.

5. The power feeding unit according to claim 2, wherein a wiring harness is connected to the electric appliance, and a connecting means to connect the wiring harness with the feeding wire being drawn from the winder is provided on the feeding wire fixing member.

6. The power feeding unit according to claim 5, wherein the feeding wire is secured with a securing member at the supporting arm.

7. The power feeding unit according to claim 2, wherein the feeding wire is connected by means of an electric connector at the supporting arm.

8. The power feeding unit according to claim 7, wherein the feeding wire is secured with a securing member at the supporting arm.

9. The power feeding unit according to claim 2, wherein the feeding wire is secured with a securing member at the supporting arm.

10. The power feeding unit according to claim 1, wherein the feeding wire drawn from the winder is arranged inside the slide rail.

11. The power feeding unit according to claim 10, wherein the feeding wire is secured with a securing member at the supporting arm.

12. The power feeding unit according to claim 1, wherein a wiring harness is connected to the electric appliance, and a connecting means to connect the wiring harness with the feeding wire being drawn from the winder is provided on the feeding wire fixing member.

13. The power feeding unit according to claim 12, wherein the feeding wire is secured with a securing member at the supporting arm.

14. The power feeding unit according to claim 1, wherein the feeding wire is connected by means of an electric connector at the supporting arm.

15. The power feeding unit according to claim 14, wherein the feeding wire is secured with a securing member at the supporting arm.

16. The power feeding unit according to claim 1, wherein the feeding wire is secured with a securing member at the supporting arm.

* * * * *